Patented Jan. 8, 1924.

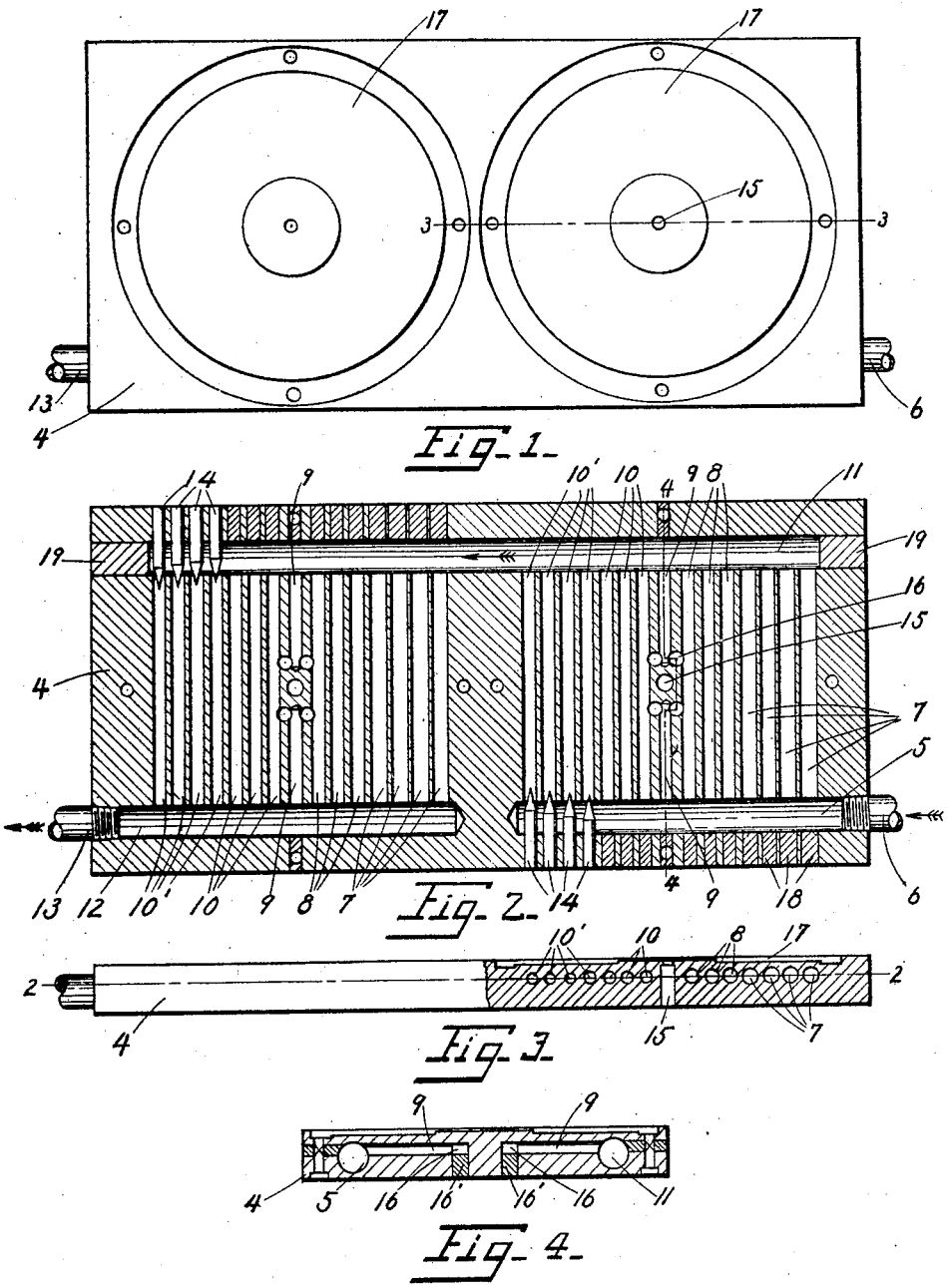

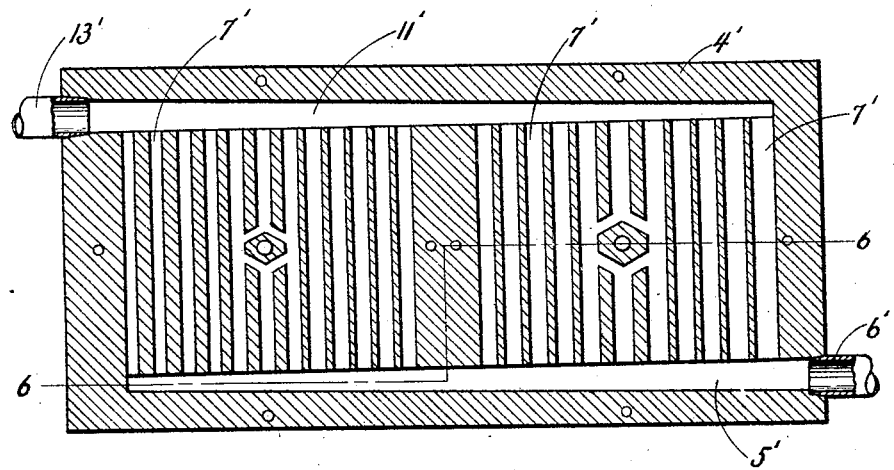
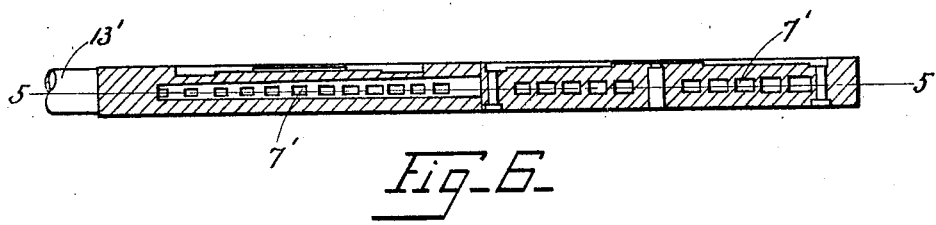

1,480,258

UNITED STATES PATENT OFFICE.

TRUMAN J. GLOVER, OF CALDWELL, NEW JERSEY, ASSIGNOR TO FEDERATED ENGINEERS DEVELOPMENT CORPORATION, OF JERSEY CITY, NEW JERSEY, A CORPORATION OF DELAWARE.

PRESS PLATE OR DIE FOR MANUFACTURING PHONOGRAPH RECORDS.

Application filed September 7, 1921. Serial No. 499,017.

*To all whom it may concern:*

Be it known that I, TRUMAN J. GLOVER, a citizen of the United States, residing at Caldwell, in the county of Essex and State of New Jersey, have invented certain new and useful Improvements in Press Plates or Dies for Manufacturing Phonograph Records; and I do hereby declare the following to be a full, clear, and exact description of the same, reference being had to the accompanying drawings, forming part of this specification.

This invention relates to press plates or dies for the manufacture of articles from thermoplastic material and particularly to dies for the formation of phonograph records from such material.

In the manufacture of phonograph records a matrix is seated on the lower of two heated dies and a mass of hot plastic record material poured or otherwise placed on the surface of the matrix. The heated mass is then squeezed between said matrix and a corresponding matrix secured on the other or upper of said dies until the record is formed. When the mass of heated material is first introduced into the dies, said dies are adapted to be heated but immediately after the said material is introduced and subjected to the squeezing pressure, the dies are cooled to harden the record material between them so as to permit the removal of the record from the dies. Steam and cold water are utilized for the heating and cooling operations, respectively.

In this manufacture it is indispensable to secure an even change of temperature over the entire surface of the dies in order to prevent loss from breakage or from the formation of imperfect records and in order to hold the labor charge down to a minimum the changes in the temperature of the dies must be effected as quickly as possible.

An object of the present invention is to provide a die or press plate whose surface throughout the entire matrix supporting area may be rapidly and evenly heated and cooled, alternately.

A further object is the provision of means for varying the flow of heating or cooling fluids through various portions of the matrix supporting surface of the die whereby the speed at which any portion of the die is cooled or heated may be regulated and a substantially uniform cooling or heating of the plastic material secured.

In the accompanying drawings—

Figure 1 is a top plan view of a die or press plate, the die shown being of dual pattern for the formation of two phonograph records of the disk type;

Figure 2 is a top plan view in section on the line 2—2 of Figure 3;

Figure 3 is a side elevation, partly in section, on the line 3—3 of Figure 1;

Figure 4 is a section on the line 4—4 of Fig. 2;

Fig. 5 is a top plan view, in section, on the line 5—5 of Fig. 6, showing a modified form of die; and Fig. 6 is a vertical elevation, in section, on the line 6—6 of Fig. 5.

As hereinbefore outlined, two dies are used in the production of the records, but as both are identical in construction, the illustration and description of one only of the dies will suffice for the present purposes.

The die 4 is of rectangular formation, and as illustrated is provided with two depressions for the accommodation of two matrices, there being a vertical opening in the die centrally of each of the two depressions for centering the matrices, the latter being secured on the die by suitable means such as the usual clamping ring (not shown) which engages around the edge of the matrix.

Immediately below one of the matrix receiving surfaces of the die and preferably extending crosswise the die is a plurality of fluid conducting channels 7, 8, 9, 10 and 10' which communicate at one side of the die plate with an inlet passage 5, drilled or otherwise formed in the die and extending longitudinally of the die about half way the latter. Heating and cooling fluids are applied to the passage 5 through a pipe 6, an ordinary three way valve (not shown) being interposed in the pipe 6 at any suitable point for alternate supply of steam and cold water through said pipe.

Water or steam supplied to the inlet passage 5 will be carried across the die immediately below its matrix surface and at their opposite ends the channels 7, 8, 9, 10 and 10' empty into a passage 11 extending longitudinally of the die and communicating with a second series of conducting channels 7, 8, 9, 10 and 10' located immediately beneath the other matrix supporting surface of the die. A discharge passage 12 preferably drilled in alinement with the inlet passage 5, communicates with the second series of conducting channels, the water or steam flowing from the discharge passage to an outlet pipe 13.

It will be observed that a fluid entering through the pipe 6, at a considerable velocity, will, because of its momentum, tend to flow past the first of the conducting channels to the farther end of the passage 5 and produce the greater pressure and flow through the channels 10'. A less pressure and flow would, for the same reason, be produced through the channels nearest the entrance end of passage 5, and, therefore, if all of the channels were of equal cross-sectional area, a larger volume of fluid would tend to pass from the inlet passage 5 through the channels 10' at one side of the matrix supporting surface than through the channels 7 at the other side of said surface and would heat or cool that surface unequally.

To prevent this undesirable condition, the channels are preferably arranged in groups and channels 7 in the group nearest the point of ingress of fluids into pipe 5 are made with a relatively large cross sectional area. The channels 8 in the next adjacent group are made of somewhat smaller cross sectional area and the several channels in the succeeding groups, 9, 10 and 10' are made progressively smaller towards the inner end of passage 5. The same conditions would of course exist with fluid flowing from passage 11 through the second series of channels under the other matrix supporting surface of the die, and these channels are likewise arranged in groups with the channels of the group nearest the point of ingress of fluid made of relatively large cross sectional area and those of the succeeding groups made progressively smaller.

It will be evident that this construction of channels for obtaining an equal cooling or heating of the entire die surface is not limited to use with the particular form of die as it is possible to vary the size of the channels to accommodate varying volumes of fluids and thus overcome an unevenness of pressure in the several channels of a die, regardless of the construction of the die and channels. Furthermore, the channels of each series need not necessarily be arranged in groups as the first channel 7 can be made comparatively large and each succeeding channel smaller, each channel being of a different cross sectional area, but it is preferred to group the channels as a less number of drills or other working tools are required and it would not be necessary to provide a large number of regulating devices, each of a different size for varying the flow of fluid through the conducting channels as hereinafter described.

To still further control the flow of fluid through the channels 7, 8, 9, 10 and 10' and provide for adjustment of the flow of fluids therethrough as would be necessary should there be a variation in the initial pressure or velocity of the fluid admitted through pipe 6, regulating means are provided, preferably in the form of conically pointed plugs 14 adjustably secured in the die with their pointed ends positioned to be adjusted into and out of the entry ends of channels 10' or any other of the channels as may be required. As will be understood, by longitudinal adjustment of the plugs 14, any of the channels may be partially closed to throttle the flow of fluid through said channels. The holes formed between the side of the die and inlet passage 5 and between the other side of the die and passage 11, in drilling the several conducting channels, are closed by plugs 18, but any one of these plugs may readily be removed for the insertion of the pointed plugs 14.

Where an opening is required vertically through the die such as at 15 and it is impossible to form a continuous transverse channel, as at 9, holes 16 are drilled through from the under side of the die to pierce and remove the walls between channels 9 and 8, and 9 and 10. These holes 16 are closed from the under side of the die by plugs 16' to prevent fluid escaping, and fluid flowing through the channels 9 may by-pass through openings 16 and continue its flow through to the passage 11.

This construction provides means by which a flow through all parts of the die or plate may be controlled to heat and cool each part of the die with such speed as may be found desirable, and the large flow permitted by this construction enables an exceedingly rapid heating and cooling of the die.

The ends of passage 11 are closed by plugs 19.

In a form of die where the discharge is taken from a part of the die out of line with the inlet, a construction such as shown in Figs. 5 and 6 may be used, in which the die 4' is chambered to receive the flow of liquid through an inlet pipe 6' into the passage 5'. Passage 5' extends practically the entire length of the die and communicates with all the channels of both matrix receiving surfaces and all of these channels designated by the numeral 7' likewise empty into a single outlet passage 11' on the opposite side of the die and discharging into a pipe 13'.

As in the former construction, channels 7' are made of varying cross-sectional areas and any one or more of said channels may be provided with means for regulating the flow of fluid therethrough as described in connection with the preferred embodiment of the invention.

However, a similar result may be obtained by tapering the passages 5' and 11' so that the passage 5' is progressively reduced in cross-sectional area in the direction of the flow of fluid therethrough while the passage 11' is progressively increased in cross-sectional area in the direction of flow therethrough. The cross-sectional area of each passage is thus varied progressively in inverse ratio to the pressure of the fluid flowing through them. It will be understood of course that the passages 5 and 11 in Fig. 1 may be similarly tapered in order to dispense with the plugs 14 and thereby regulate the flow through the channels so as to maintain an even distribution of the heating and cooling fluids through said channels.

What is claimed is:

1. A die for shaping thermoplastic material comprising a body having an inlet passage therein, a series of fluid conducting channels of varying cross-sectional area communicating with said passage and an outlet passage communicating with said channels.

2. A die for shaping thermoplastic material comprising a body having an inlet passage and an outlet passage therein, and channels connecting said inlet and outlet passages, said channels being variously proportioned to secure a uniform flow therethrough.

3. A die for shaping thermoplastic material comprising a body formed with an inlet passage, a plurality of fluid conducting channels communicating with said passage, the cross-sectional area of said channels varying respectively in inverse proportion to the relative pressure of the fluid they are adapted to conduct.

4. A die for shaping thermoplastic material comprising a body formed with fluid conducting passages therein, the cross-sectional area of said passages being variously proportioned in inverse ratio to the relative pressure of fluid flowing through them.

5. A die for shaping thermoplastic material comprising a body having an inlet passage therein for heating and cooling fluids, a series of fluid conducting channels communicating with said passage, the channels adjacent the point of ingress of fluid into said inlet passage being of greater cross-sectional area than those remote from said point and an outlet passage communicating with said channels.

6. A die for shaping thermoplastic material comprising a body having an inlet passage therein for heating and cooling fluids, a plurality of fluid conducting channels communicating with said passage, said channels being arranged in groups and the cross-sectional area of each group decreasing towards the inner end of said inlet passage, and an outlet passage for said channels.

7. A disk pressing die for shaping thermoplastic material comprising a body having a series of channels immediately below its matrix face, the cross-sectional area of said channels decreasing from one end of the series to the other, and inlet and outlet passages communicating with each of said channels.

8. A disk pressing die for shaping thermoplastic material comprising a body having a passage therein extending inwardly from one wall thereof, a series of fluid conducting channels extending transversely of and communicating with said passage, said channels being arranged in groups longitudinally of the passage and the cross-sectional area of the channels of the group at the inner end of said passage being less than the cross-sectional area of the other channels, and an outlet passage communicating with said channels.

9. A disk pressing die for shaping thermoplastic material comprising a body having an inlet passage therein for heating and cooling fluids, a series of fluid conducting channels communicating with said passages, said channels adjacent the point of ingress of fluid into said inlet passage being of greater cross-sectional area than those remote from said point, an outlet passage communicating with the channels, and regulating means for varying the flow of fluids through said channels.

10. A disk pressing die for shaping thermoplastic material comprising a body having an inlet passage therein for heating and cooling fluids, a series of fluid conducting channels communicating with said passage, the channels adjacent the point of ingress of fluid into said inlet passage being of greater cross-sectional area than those remote from said point, an outlet passage communicating with the channels, and independently operable means for varying the flow of fluids through said channels.

11. A disk pressing die for shaping thermoplastic material comprising a body having an inlet passage therein for heating and cooling fluids, a series of fluid conducting channels communicating with said passage, the channels adjacent the point of ingress of fluid into said inlet passage being of greater cross-sectional area than those remote from said point, an outlet passage communicating with the channels, and means for varying the cross-sectional area of said channels at the point of communication with said inlet passage, whereby the flow of fluid through any one of said channels may be regulated.

12. A disk pressing die for shaping thermoplastic material comprising a body having a plurality of matrix surfaces, a series of fluid conducting channels extending through said body adjacent each matrix surface, an inlet passage communicating with each series of channels and an outlet passage for the channels, the cross sectional area of the channels of each series being proportioned approximately to the proximity of the respective channels to the point of ingress of fluid into said inlet passage.

TRUMAN J. GLOVER.